(12) United States Patent
Berger

(10) Patent No.: US 6,592,319 B2
(45) Date of Patent: Jul. 15, 2003

(54) GATE EXTENSION ASSEMBLY FOR BED MOUNTED ROLLING RACKS

(75) Inventor: Monte R. Berger, Udall, KS (US)

(73) Assignee: Unruh Fab, Inc., Sedgwick, KS (US)

(*) Notice: Subject to any disclaimer, the term of this patent is extended or adjusted under 35 U.S.C. 154(b) by 0 days.

(21) Appl. No.: 09/948,753

(22) Filed: Sep. 7, 2001

(65) Prior Publication Data

US 2003/0049111 A1 Mar. 13, 2003

(51) Int. Cl.[7] .................................................. B60P 1/00
(52) U.S. Cl. ........................................ 414/522; 414/608
(58) Field of Search ................................ 414/498, 522, 414/679, 608; 211/41.14

(56) References Cited

U.S. PATENT DOCUMENTS

| | | | | | |
|---|---|---|---|---|---|
| 3,809,266 A | * | 5/1974 | Salerni | ........................ | 414/462 |
| 3,887,083 A | * | 6/1975 | Baxter | ........................ | 414/12 |
| 4,033,597 A | * | 7/1977 | Stange et al. | ................. | 271/195 |
| 4,950,123 A | * | 8/1990 | Brockhaus | .................. | 414/522 |
| 5,064,335 A | * | 11/1991 | Bergeron et al. | ........... | 414/522 |
| 5,411,360 A | * | 5/1995 | Hilliker et al. | ............. | 414/608 |
| 5,795,125 A | * | 8/1998 | Walkden | ...................... | 414/537 |
| 6,227,788 B1 | * | 5/2001 | Brown et al. | ................ | 414/480 |
| 6,253,976 B1 | * | 7/2001 | Coleman et al. | ............ | 224/404 |

\* cited by examiner

Primary Examiner—Eileen D. Lillis
Assistant Examiner—Charles A. Fox
(74) Attorney, Agent, or Firm—Kenneth H. Jack; Davis & Jack, LLC

(57) ABSTRACT

An apparatus for loading, storing, and unloading cargo such as glass panes upon a truck or trailer bed, the truck or trailer bed having a pivoting gate, the apparatus consisting of left and right "C" channel beams, the lower flanges of the left and right "C" channel beams forming left and right bed roller tracks; a load bearing rack having a plurality of left and right wheels or rollers oriented for rolling motion along the left and right bed roller tracks, left and right gate roller tracks formed of rectangular steel tubing, and left and right hinges respectively pivotally attaching the left and right gate roller tracks for pivotal motion between the first extended positions overlying an opened pickup truck or trailer gate, and second retracted positions allowing closure of the gate.

9 Claims, 4 Drawing Sheets

GATE EXTENSION ASSEMBLY FOR BED MOUNTED ROLLING RACKS

FIELD OF THE INVENTION

This invention relates to rolling load bearing racks mountable upon truck or trailer beds.

BACKGROUND OF THE INVENTION

Rolling load bearing racks of the type depicted in U.S. Pat. No. 6,247,601 issued to Jun. 19, 2001, to Norton, et al., are commonly installed upon floors of pickup truck or trailer beds. Upon such installation, it is desirable to maintain in place a pivoting load securing gate of the type common to pickup trucks. While such gates may suitably be removed, they desirably function, in unison with a rolling rack, as a step stand when opened and as a cargo space closure. However, upon opening of such truck or trailer gate, and upon full rolling movement of the rolling load bearing rack toward such gate, the gate may undesirably interfere with access to the roller carriage.

The instant inventive assembly solves the above described undesirable traits and features of common truck or trailer mounted rolling load bearing rack assemblies by providing alternately extendable and displaceable gate roller tracks, such tracks allowing full rearward rolling motion of the rolling load bearing rack to the outer lip of an opened truck or trailer gate.

BRIEF SUMMARY OF THE INVENTION

A first structural component of the instant inventive assembly preferably comprises a rectangular base frame fitted for fixed installation upon a common truck or trailer bed floor. Preferably, longitudinal side rails of the base frame are fabricated to include "C" channel beams oriented so that their channels are laterally opposed and inwardly opening; the upper surfaces of the lower flanges of the "C" channel beams serving as left and right roller tracks. Preferably, a series of crossbeams or braces support, span between, and rigidly interconnect the left and right "C" channel beams. The crossbeams in combination with the "C" channel beams preferably form a rigid rearwardly opening box frame.

A second component of the instant inventive assembly comprises a roller carriage or rolling load bearing rack having left and right wheels or rollers oriented for rolling engagement with the channels of the preferred left and right "C" channel beams. As indicated in the above referenced U.S. Pat. No. 6,247,601 issued to Norton, et al., such roller carriage may advantageously be configured for loading, storage, and unloading of automobile glass panes. Such glass pane carrying configuration is representative of numerous adaptations of roller carriages for storage, loading, and unloading of various types of cargo.

A third structural component of the instant inventive assembly comprises left and right gate roller tracks, such tracks preferably having a length sufficient to span an opened pickup truck tailgate, an opened trailer tailgate, or an opened trailer side gate upon extension of such tracks from the rearward ends of the left and right "C" channel beams. Preferably, the left and right gate roller tracks are fabricated from lengths of structural rectangular steel tubing. Also preferably, roll stopping upturned flanges are fixedly welded to the distal or rearward ends of the gate roller tracks.

A fourth structural component of the instant inventive assembly comprises mounting means adapted for alternately positioning the gate roller tracks in first and second positions; the left and right gate roller tracks extending outwardly from the rearward ends of the "C" channel beams while in their first position; the gate roller tracks being displaced away from their outwardly extended positions while in their second positions. Said first gate roller track position facilitates extended rolling movement of a load bearing rack over an opened tailgate or side gate. The second position, wherein the gate roller tracks are displaced from their outwardly extended positions, facilitates closure of the gate.

A preferred mounting means for achieving such alternate first and second gate roller track positions comprises left and right hinges respectively interconnecting the forward ends of the left and right gate roller tracks with the rearward ends of the left and right "C" channel beams. Where such preferred hinges are utilized, the gate roller tracks may pivot to their outwardly extended positions. From such outwardly extended positions, the preferred hinges facilitate pivoting displacement to an inwardly extended orientation, clearing the gate for closing.

Suitable alternate gate roller track mounting means comprise fasteners such as slip sleeve and slip pin joints, pin and eye joints, "T" ridge and "T" channel joints, slide ridge and slide channel joints, pin and clevice joints, and quick disconnect couplings. Where such alternate mounting means are utilized, the first outwardly extended positions of the gate roller tracks are identical to those facilitated by the preferred hinges. The second displaced positions of the gate roller tracks may constitute any removed location or position of the gate roller tracks, provided that such positioning clears the gate for closure.

Accordingly, it is an object of the present invention to provide a truck or trailer mountable roller carriage assembly capable of rolling motion over an opened truck or trailer tailgate or side gate.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
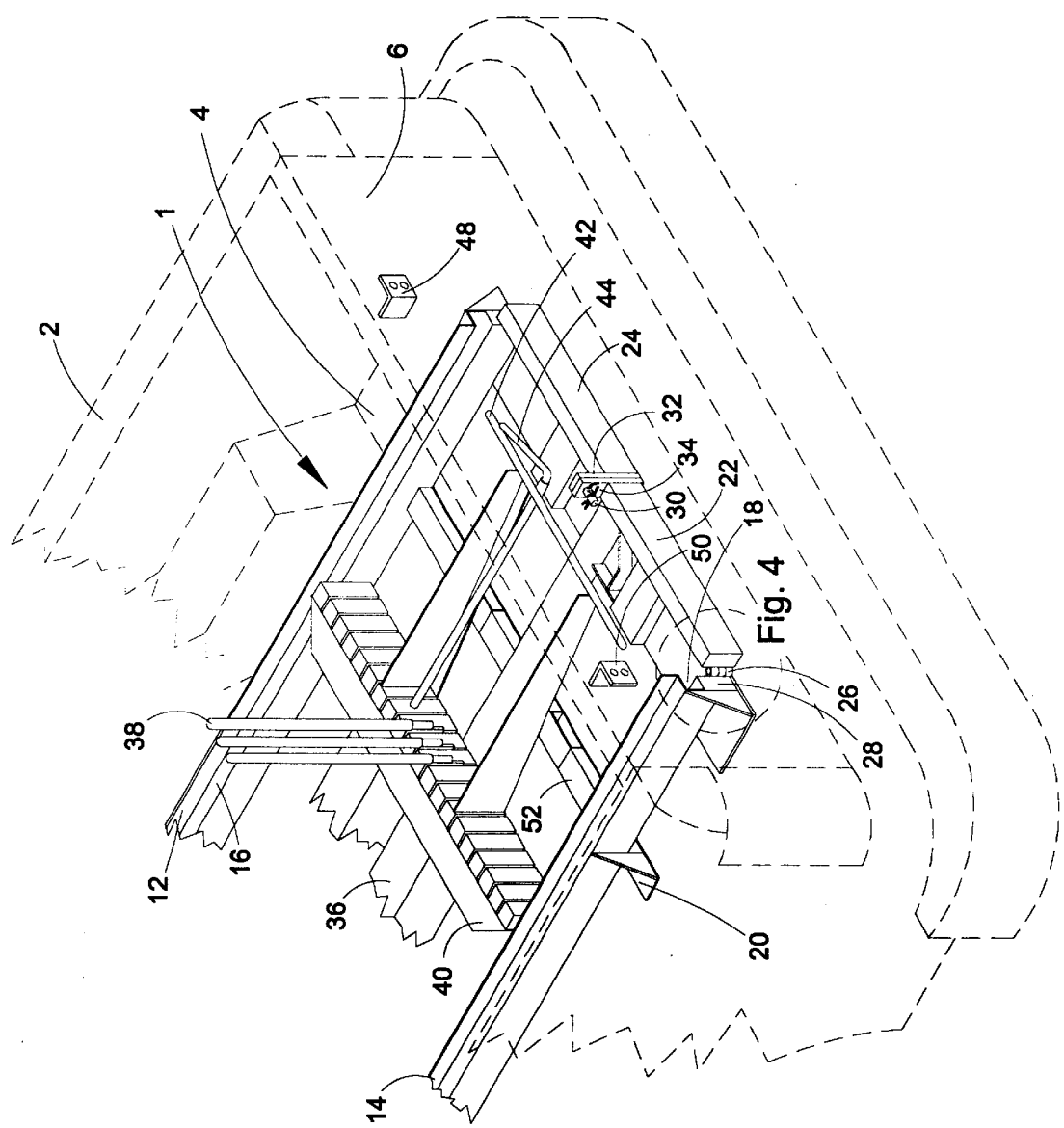
FIG. 1 is a partial isometric view of the instant inventive assembly.

Referring now to the drawings, and in particular to FIG. 1. The instant inventive assembly is referred to generally by reference arrow 1. The assembly 1 preferably comprises right and left side rails 12 and 14; the side rails 12 and 14 preferably respectively comprising inwardly opening "C" channel beams 16 and 18. Preferably, the side rails 12 and 14, and "C" channel beams 16 and 18 are composed of steel. The upper surfaces of the lower flanges of "C" channel beams 16 and 18 serve as truck or trailer bed roller tracks. While roller tracks having open bearing surfaces (not depicted) may be suitably utilized, the depicted "C" channels 16 and 18 are preferred because they dually function as wheel or roller bearing retainers and as bearing surfaces.

Figure 2:
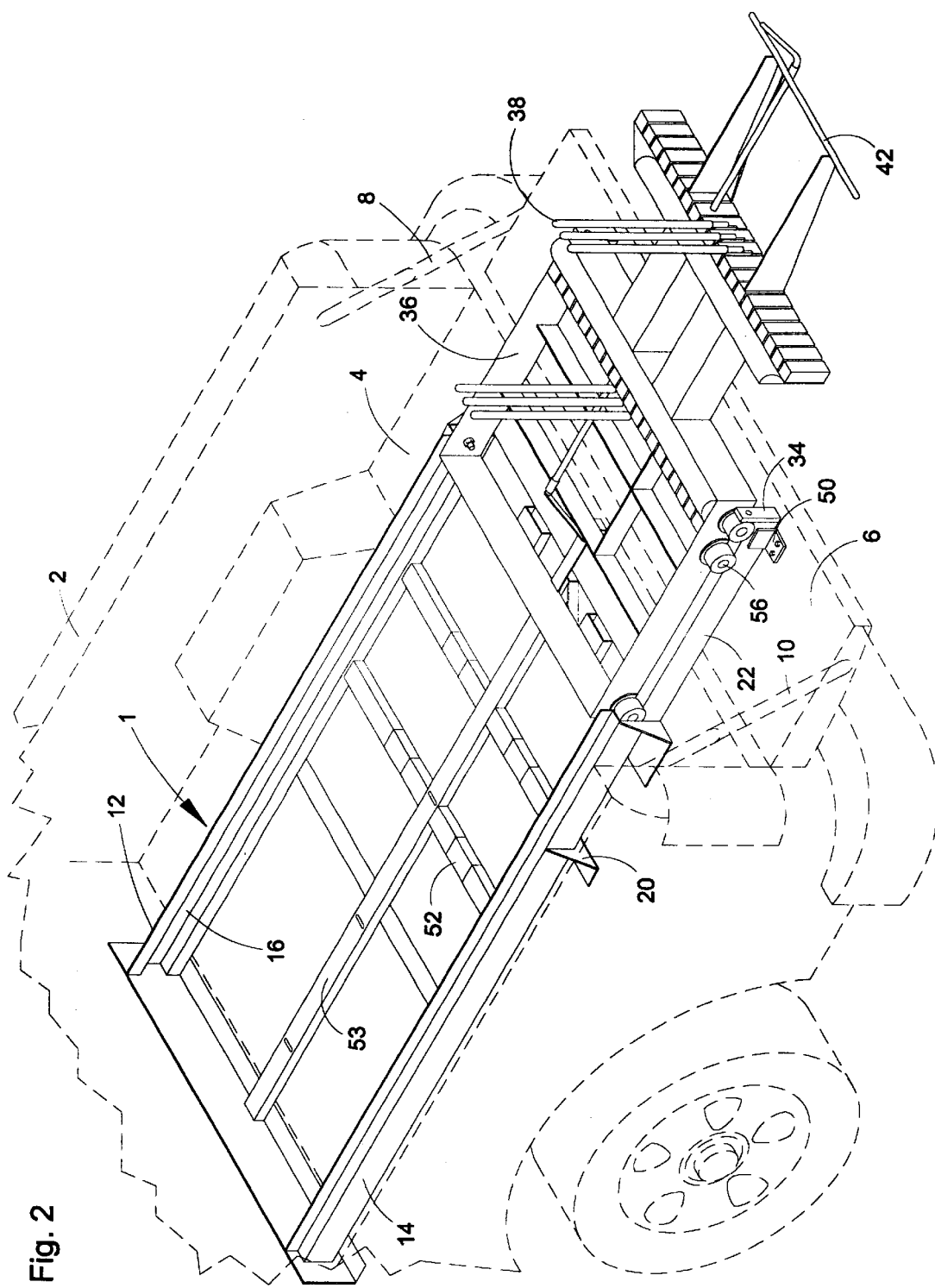
FIG. 2 is an isometric view of the instant inventive assembly shown in a rearwardly extended position.

Referring simultaneously to FIGS. 1 and 2, a plurality of crossbeams 20 rigidly interconnect side rails 12 and 14; the side rails in combination with crossbeams forming a rearwardly opening box frame. Preferably, the rearmost crossbeams 20 have forklift tine receiving sections 52 for convenient lifting of the box frame by a power forklift for placement of the box frame upon a bed floor 4 of a truck or trailer bed 2.

Figure 3:
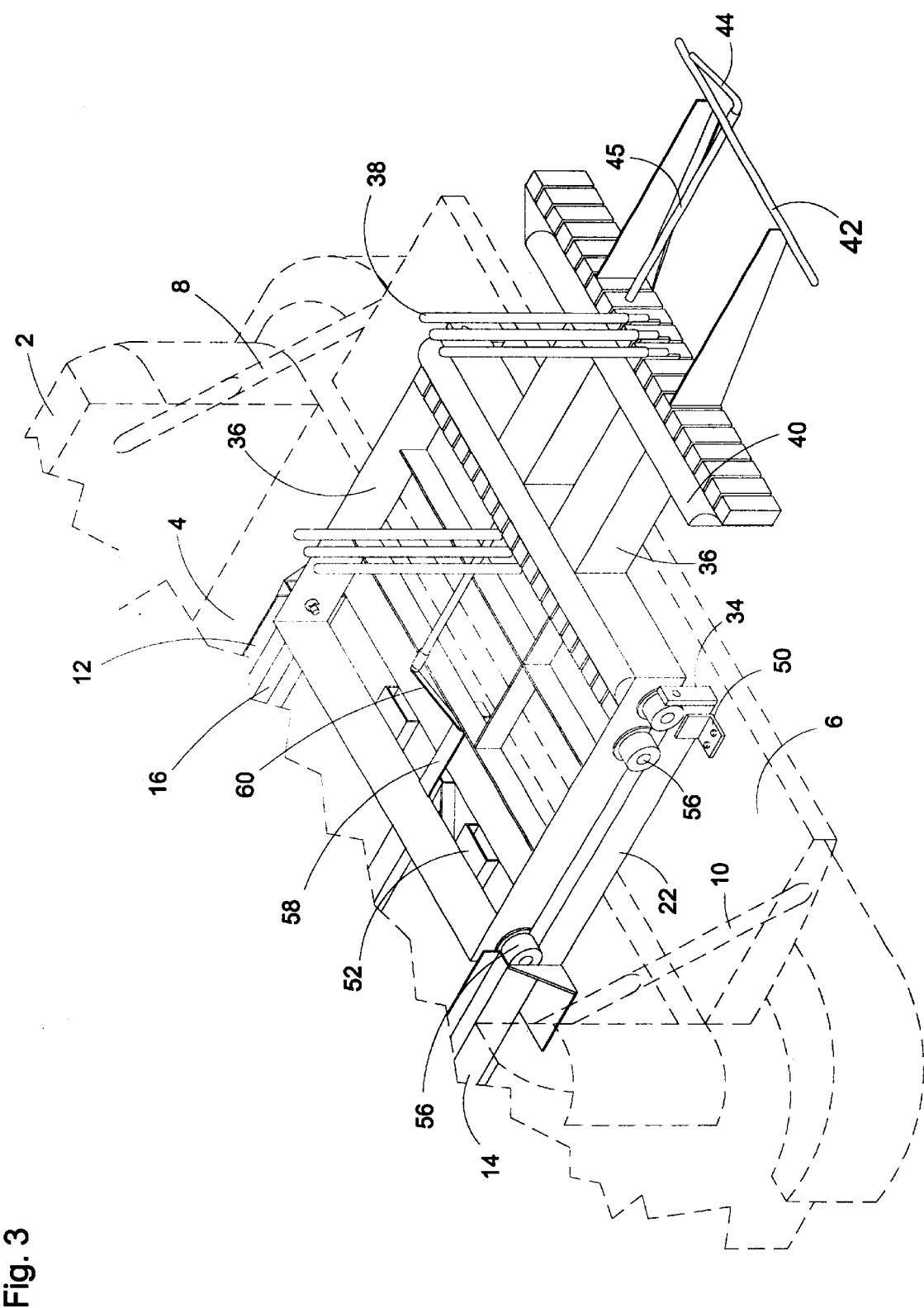
FIG. 3 is a partial magnified view of FIG. 2.

Referring simultaneously to FIGS. 2 and 3, a latch receiving bar 53 preferably extends along the longitudinal midline of the box frame, the latch bar 53 being fixedly attached to crossbeams 20; the latch bar 53 being engageable with latch and lever mechanism 58 and 60 for selectively fixedly positioning load rack 36.

Referring to FIG. 3, the load rack 36 preferably comprises a second steel box frame having leftwardly extending and rightwardly extending wheels or rollers 56 rotatably mounted thereon. The wheels or rollers 56 are closely fitted and positioned for rolling motion within "C" channels 16 and 18. The depicted load bearing rack 36 is adapted for carriage of automobile glass panes, such adaptation including pivoting glass pane supporting tines 38, and protective laterally extending pads 40. Preferably, a handle 42 is provided for alternately pushing and pulling the load bearing rack 36. The handle 42 preferably supports a latch actuation shaft 45 and turn bar 44, such shaft turning lever 60 for alternate engagement and disengagement of latch 58 with, referring to FIG. 2, latch bar 53. The depicted glass pane carrying rack 36 is representative of numerous cargo carrying rack adaptations falling within the scope of the invention.

Referring to FIG. 1, left and right gate roller tracks 22 and 24, are preferably pivotally mounted at the rearward ends of "C" channel beams 16 and 18, and upon side rails 14 and 12 by hinges 26. Preferably, the rearward or distal ends of the gate roller tracks 22 and 24 have upturned roll stopping flanges 34 and 32 fixedly attached thereto. Referring simultaneously to FIGS. 1 and 2, the upturned flanges 34 and 32 are preferably apertured for sliding receipt of a removable lock pin 30 allowing the gate roller tracks 22 and 24 to be secured in their forwardly retracted positions. While the gate roller tracks 22 and 24 are forwardly pivoted to their positions as depicted in FIG. 1, gate 6 is cleared for pivotal upward movement to a closed position.

Figure 4:
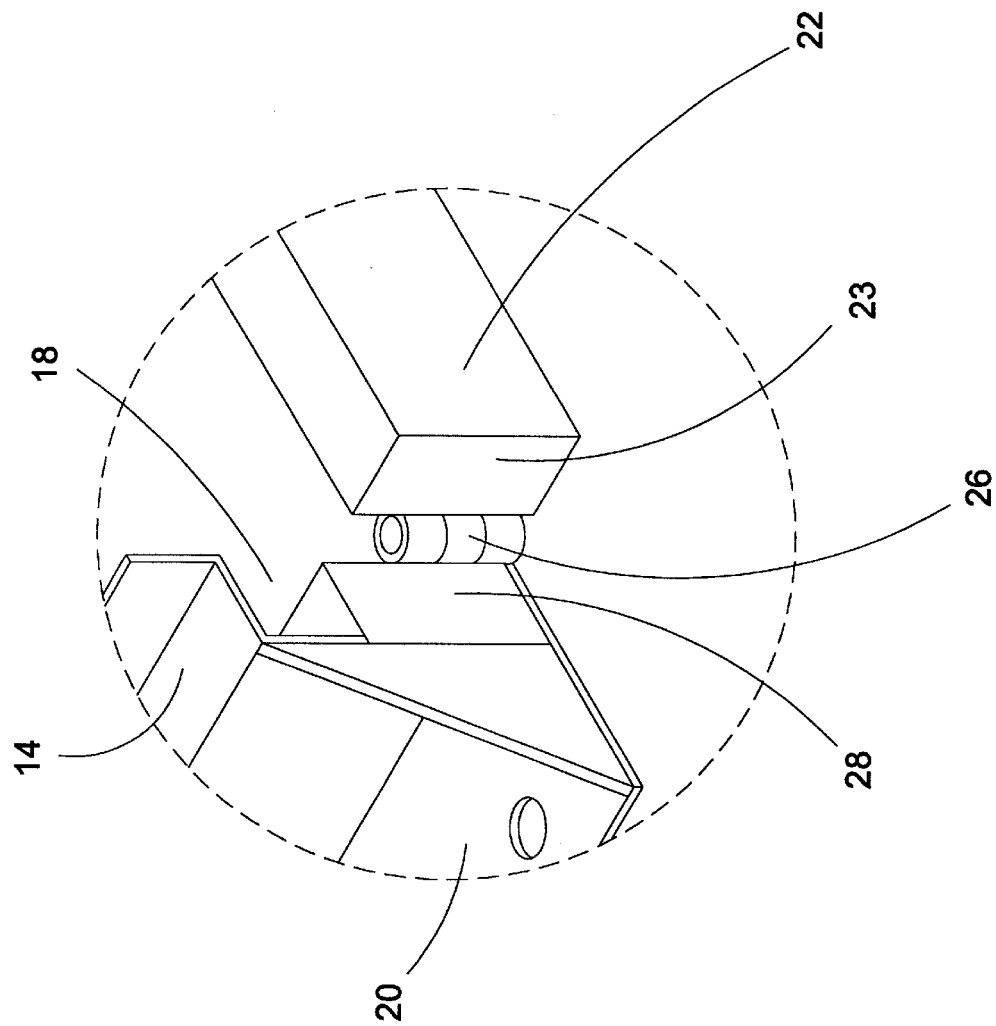
FIG. 4 is a partial magnified view of FIG. 1.

Referring simultaneously to FIGS. 1 and 3, gate 6 may be opened, pivotally moving downward to a substantially horizontal position supported by right and left elbow braces 8 and 10. Referring to FIG. 1, pin 30 may then be removed from upturned roll stopping flanges 32 and 34, and gate roller tracks 22 and 24 may then be outwardly and rearwardly pivoted to rearwardly extended positions as depicted in FIG. 3. Referring simultaneously to FIGS. 1 and 3, right and left roller track engaging flanges 48 and 50 are preferably fixedly mounted upon the upper surface of gate 6, such flanges serving as pivot stops for preventing hyper-extension of the left and right gate roller tracks 22 and 24. Referring simultaneously to FIGS. 1 and 4, front end plates 23 of the left and right gate roller tracks 22 and 24 may come into striking contact with rear end plates 28 of the left and right side rails 14 and 12. Such contacts of end plates 23 and 28 similarly resist hyperextension of the gate roller tracks 22 and 24, and such end plates 23 and 28 may suitably alternately comprise the pivot stopping means.

In use of the inventive assembly, configuration of the gate roller tracks as depicted in FIG. 2 allows the rolling load bearing rack 36 to be rollably moved rearwardly to a position overlying gate 6. Following rolling return of the load bearing rack 36 to its forward position within the truck or trailer bed 2, the track assembly may be reconfigured as depicted in FIG. 1 and gate 6 may then be closed.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An apparatus for loading, storing, and unloading cargo upon a truck or trailer bed, the truck or trailer bed comprising a bed floor and a pivoting tailgate or side gate, the apparatus comprising:

(a) left and right bed roller tracks, each having an upper surface, and a rearward end;

(b) a load rack having a plurality of left and right wheels or rollers respectively positioned for alternate forward and rearward rolling motion over the upper surfaces of the left and right bed roller tracks;

(c) left and right gate roller tracks, each having an upper surface, a forward end, and a rearward end; and (d) mounting means adapted for alternately extending the left and right gate roller tracks from the rearward ends of the left and right bed roller tracks, and displacing said gate roller tracks from their extended positions; the mounting means comprising left and right hinges, the left and right gate roller tracks respectively pivoting about the left and right hinges to retracted positions upon displacement from their extended positions; and further comprising left and right pivot stops adapted for respectively resisting pivoting motions of the left and right gate roller tracks upon full extensions of said roller tracks.

2. The apparatus of claim 1 wherein the left and right pivot stops comprise left and right gate mounted flanges.

3. The apparatus of claim 2 further comprising left and right roll stops respectively fixedly attached to the rearward ends of the left and right gate roller tracks.

4. The apparatus of claim 3 wherein the left and right roll stops respectively comprise left and right upturned flanges.

5. The apparatus of claim 4 wherein the left and right upturned flanges have pin receiving apertures therethrough, and further comprising a lock pin laterally extendable therethrough upon full retraction of the left and right gate roller tracks.

6. The apparatus of claim 5 wherein the load rack is adapted for carriage of glass panes.

7. The apparatus of claim 6 wherein the left and right bed roller tracks respectively comprise lower flanges of inwardly opening left and right "C" channel beams, and further comprising a plurality of mounting braces spanning between and rigidly interconnecting the left and right "C" channel beams.

8. The apparatus of claim 7 wherein the left and right gate roller tracks comprise upper walls of segments of rectangular structural tubing.

9. The apparatus of claim 8 wherein the left and right bed roller tracks, the load rack, and the left and right gate roller tracks are composed of steel.

\* \* \* \* \*